US007857523B2

(12) United States Patent
Masuzaki

(10) Patent No.: US 7,857,523 B2
(45) Date of Patent: Dec. 28, 2010

(54) WATERPROOF CONNECTOR HAVING MOVABLE CONNECTOR MEMBER AND WATERPROOF APPARATUS USING THE SAME

(75) Inventor: Yasuhiro Masuzaki, Tokyo (JP)

(73) Assignee: Hirose Electric Co., Ltd., Tokyo (JP)

( * ) Notice: Subject to any disclaimer, the term of this patent is extended or adjusted under 35 U.S.C. 154(b) by 0 days.

(21) Appl. No.: 12/453,959

(22) Filed: May 28, 2009

(65) Prior Publication Data

US 2009/0305542 A1 Dec. 10, 2009

(30) Foreign Application Priority Data

Jun. 4, 2008 (JP) ............... 2008-146659

(51) Int. Cl.
*G02B 6/38* (2006.01)
(52) U.S. Cl. .............................. 385/60; 385/72; 385/78
(58) Field of Classification Search ............ 385/60, 385/72, 78
See application file for complete search history.

(56) References Cited

U.S. PATENT DOCUMENTS

| | | | | |
|---|---|---|---|---|
| 5,181,267 A | * | 1/1993 | Gerace et al. ............... | 385/86 |
| 5,542,015 A | * | 7/1996 | Hultermans .................. | 385/60 |
| 6,238,101 B1 | * | 5/2001 | Chen et al. .................. | 385/60 |
| 6,386,766 B1 | * | 5/2002 | Lee .............................. | 385/56 |
| 7,178,988 B2 | * | 2/2007 | Terakura ...................... | 385/69 |
| 7,201,518 B2 | * | 4/2007 | Holmquist ................... | 385/60 |
| 7,264,402 B2 | * | 9/2007 | Theuerkorn et al. .......... | 385/59 |
| 7,306,485 B2 | * | 12/2007 | Masuzaki ................... | 439/587 |
| 7,572,065 B2 | * | 8/2009 | Lu et al. ...................... | 385/78 |
| 2009/0148101 A1 | * | 6/2009 | Lu et al. ...................... | 385/56 |

FOREIGN PATENT DOCUMENTS

JP 2007-234416 9/2007

* cited by examiner

*Primary Examiner*—Hae Moon Hyeon
(74) *Attorney, Agent, or Firm*—Kubotera & Associates, LLC

(57) ABSTRACT

A waterproof connector is to be connected to a mating connector, and a waterproof apparatus includes the waterproof connector and the mating connector. The waterproof connector includes a connector member to be connected to an adapter member; a connecting member to be connected to a cylindrical portion of a mating connector; and a main body portion. The connector member is able to slide along a facing direction of the connectors in a given range. The waterproof connector and the waterproof apparatus improve an efficiency of the performance by associating the operations with each other.

9 Claims, 10 Drawing Sheets

WATERPROOF CONNECTOR HAVING MOVABLE CONNECTOR MEMBER AND WATERPROOF APPARATUS USING THE SAME

CROSS-REFERENCES TO RELATED APPLICATIONS

The disclosure of Japanese Patent Application No. 2008-146659, filed on Jun. 4, 2008 is incorporated in the application by reference.

BACKGROUND OF THE INVENTION AND RELATED ART STATEMENT

The present invention relates to a waterproof connector and a waterproof apparatus using the waterproof connector.

A conventional waterproof apparatus (waterproof connector) disclosed in Patent Reference is shown in FIG. 10. The conventional waterproof apparatus comprises a pair of a waterproof connector and a mating connector. The waterproof connector includes a connector member 111 fixed to a cable 114; a sealing member 190 capable of being attached to the cable 114 sideway; and a hood member 150 extending along the cable 114 in a state that the cable 114 is inserted therein. The mating connector includes an adapter member 112 and a housing 120 surrounding circularly an outer portion of the adapter member 112.

Patent Reference: Japanese Patent Publication No. 2007-234416

Upon using the conventional waterproof apparatus, it is required to perform separated operations independent of each other. More specifically, first, it is necessary to connect the connector member 111 of the waterproof connector to the adapter member 112 of the mating connector. Then, after connecting the connector member 111 of the waterproof connector to the adapter member 112 of the mating connector, it is necessary to move the hood member 150 of the waterproof connector along the cable 114 in order to cover the outer portion of the mating connector with a front end portion of the hood member 150. Although, is not necessary to provide the sealing member 190, it requires more complicated operations when the sealing member 190 is provided.

As described above, when the conventional waterproof apparatus is used, it is required to perform the separated operations independent of each other. As a result, an operation of the waterproof apparatus becomes relatively complicated.

In view of the problems described above, an object of the present invention is to provide a waterproof connector and a waterproof apparatus using the waterproof connector capable of improving an operational efficiency thereof.

Further objects and advantages of the invention will be apparent from the following description of the invention.

SUMMARY OF THE INVENTION

In order to attain the objects described above, according to the present invention, a waterproof connector to be connected to a mating connector includes a connector member for supporting a ferrule capable of contacting with a mating ferrule of the mating connector. The connector member is detachably connected to an adapter member arranged in the mating connector for supporting the mating ferrule. Accordingly, the connector member is able to be disconnected from and connected to the adapter member in a state that the ferrule contacts with the mating ferrule.

The waterproof connector further includes a connecting member having an approximate cylindrical shape and extending toward the mating connector in a facing direction that the ferrule faces the mating ferrule. The connecting member is connected to a cylindrical portion extending from the mating connector toward the connector member and surrounding a circumference of the adapter member circularly along the facing direction. When the connecting member is connected to the cylindrical portion, the connecting member forms an overlap portion with the cylindrical portion in the facing direction.

The waterproof connector further includes a main body portion for supporting the connecting member and the connector member, so that the connector member is able to slide along the facing direction within a specific range.

When the waterproof connector is connected to the mating connector, the main body portion moves toward the mating connector relative to the connector member in the facing direction, so that the connector member supported with the main body portion approaches the adapter member and the connecting member supported with the main body portion approaches the cylindrical member simultaneously.

After the connector member is connected to the adapter member, the main body member slides relative to the connector member in the facing direction in order to connect the connecting member to the cylindrical portion.

When the waterproof connector is released from the mating connector, the main body portion slides relative to the connector member in the facing direction in order to release the connector member from the adapter member. Further, the main body portion slides to an opposite side of the mating connector relative to the connector member in the facing direction, so that the connecting member supported with the main body portion moves apart from the cylindrical member and the connector member moves apart from the adapter member simultaneously, thereby releasing the connector member from the adapter member.

According to the present invention, the waterproof connector may further include a combining member combining spaces formed with recess portions provided in an outer wall of the connector member and an inner wall of the main body portion and extending in a direction crossing the facing direction, so that the combining member supports the connector member to be capable of sliding relative the main body portion in the facing direction.

According to the present invention, in the waterproof connector described above, the recess portion provided in the outer wall of the connector member may have a span larger than the combining member in the facing direction.

According to the present invention, in the waterproof connector, it is preferable that the combining member is inserted into the main body portion with a play.

According to the present invention, in the waterproof connector described above, the main body portion may include a cylinder portion protruding toward the mating connector in the facing direction so as to form an overlap portion with an inner circumference of the cylindrical portion when the connecting member is connected to the cylindrical portion. When the waterproof connector is connected to the mating connector, the connecting member covers an outer circumference of the cylindrical portion and the cylindrical portion of the mating connector is situated in a space formed between the connecting member and the cylinder portion of the waterproof connector.

According to the present invention, the waterproof connector may further include a member disposed inside the main body portion and fixed to a rigid cord member extending inside the main body portion together with an optical fiber to be connected to the ferrule. When the rigid cord member is pulled to the opposite side of the mating connector in the facing direction, the member abuts against a wall surface of the main body portion to reduce or eliminate a force applied to the optical fiber.

According to the present invention, a waterproof apparatus includes the waterproof connector and the mating connector to be connected to the waterproof connector.

DETAILED DESCRIPTION OF THE PREFERRED EMBODIMENTS

Hereunder, embodiments of the present invention will be explained with reference to the accompanying drawings.

Figure 1:
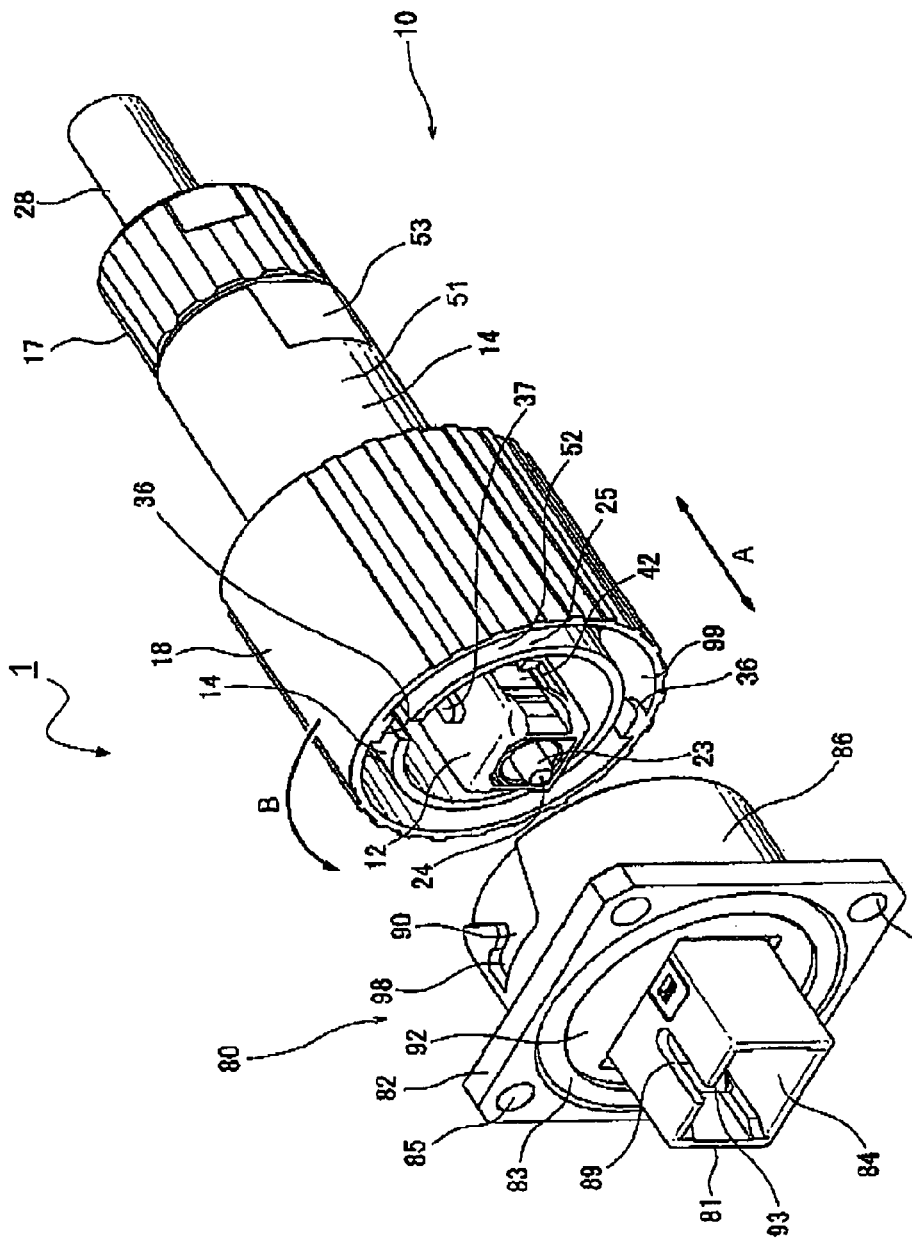
FIG. 1 is a perspective view showing a waterproof apparatus according to an embodiment of the present invention.

FIG. 1 is a perspective view showing a waterproof apparatus 1 according to an embodiment of the present invention. The waterproof apparatus 1 includes a waterproof connector 10 (plug connector) and a mating connector 80 (receptacle connector) to be connected to the waterproof connector 10.

Figure 2:
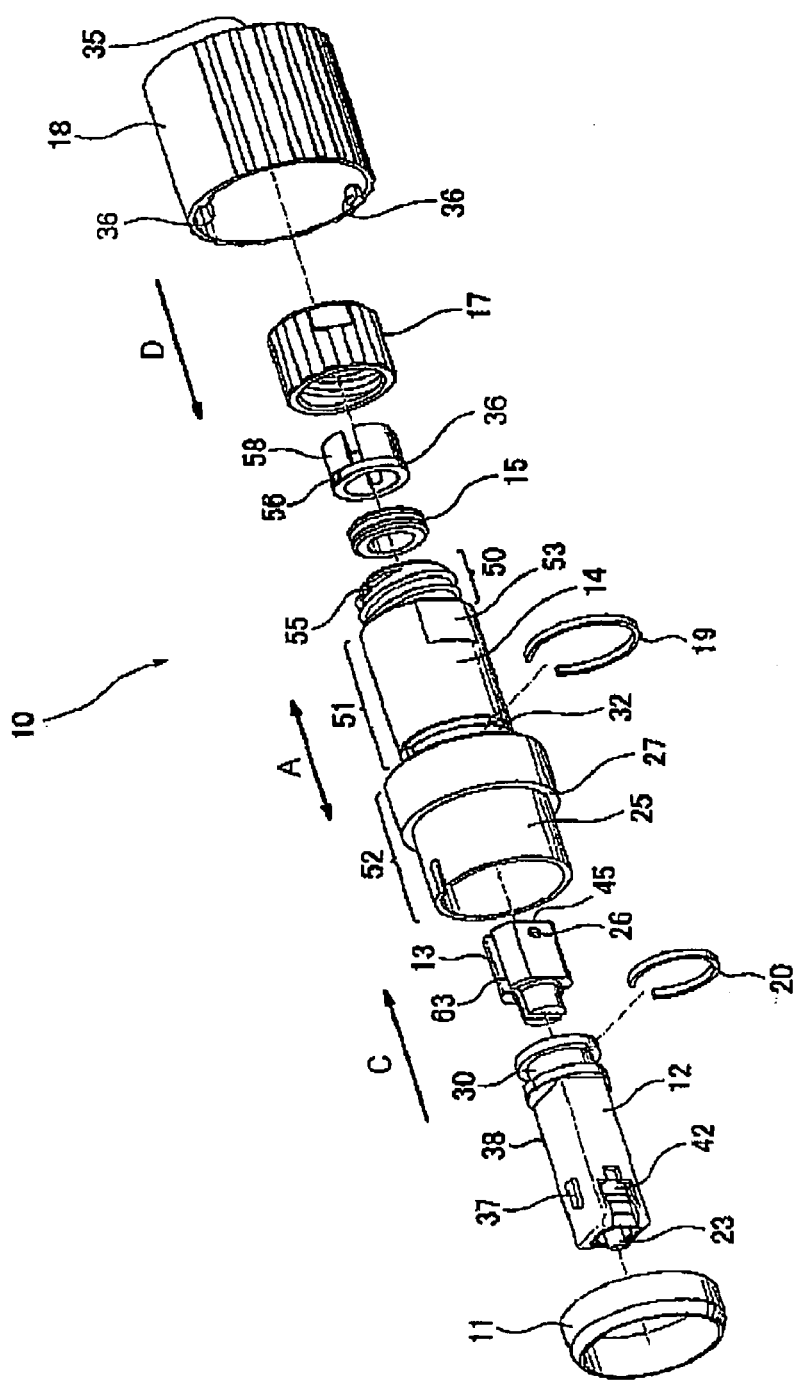
FIG. 2 is an exploded perspective view showing the waterproof connector according to the embodiment of the present invention.
Figure 3:
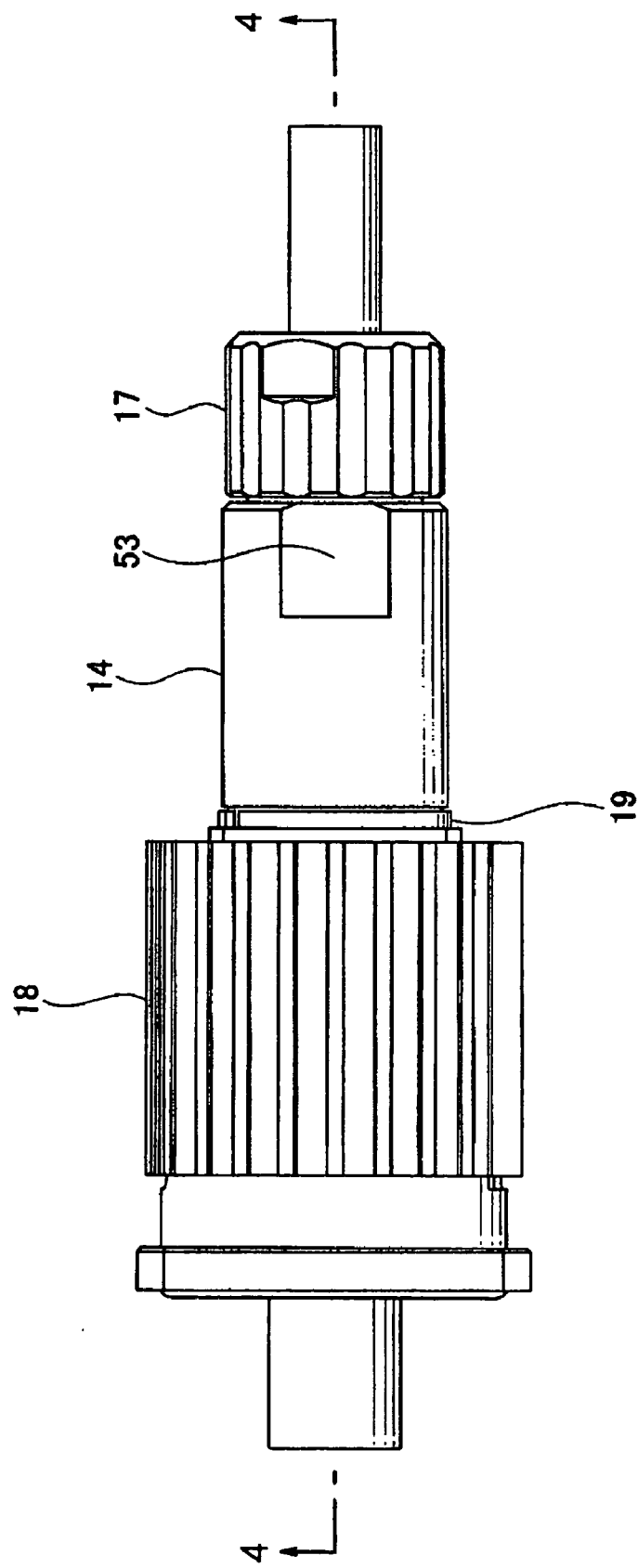
FIG. 3 is a plan view showing the waterproof connector and a mating connector according to the embodiment of the present invention.
Figure 4:
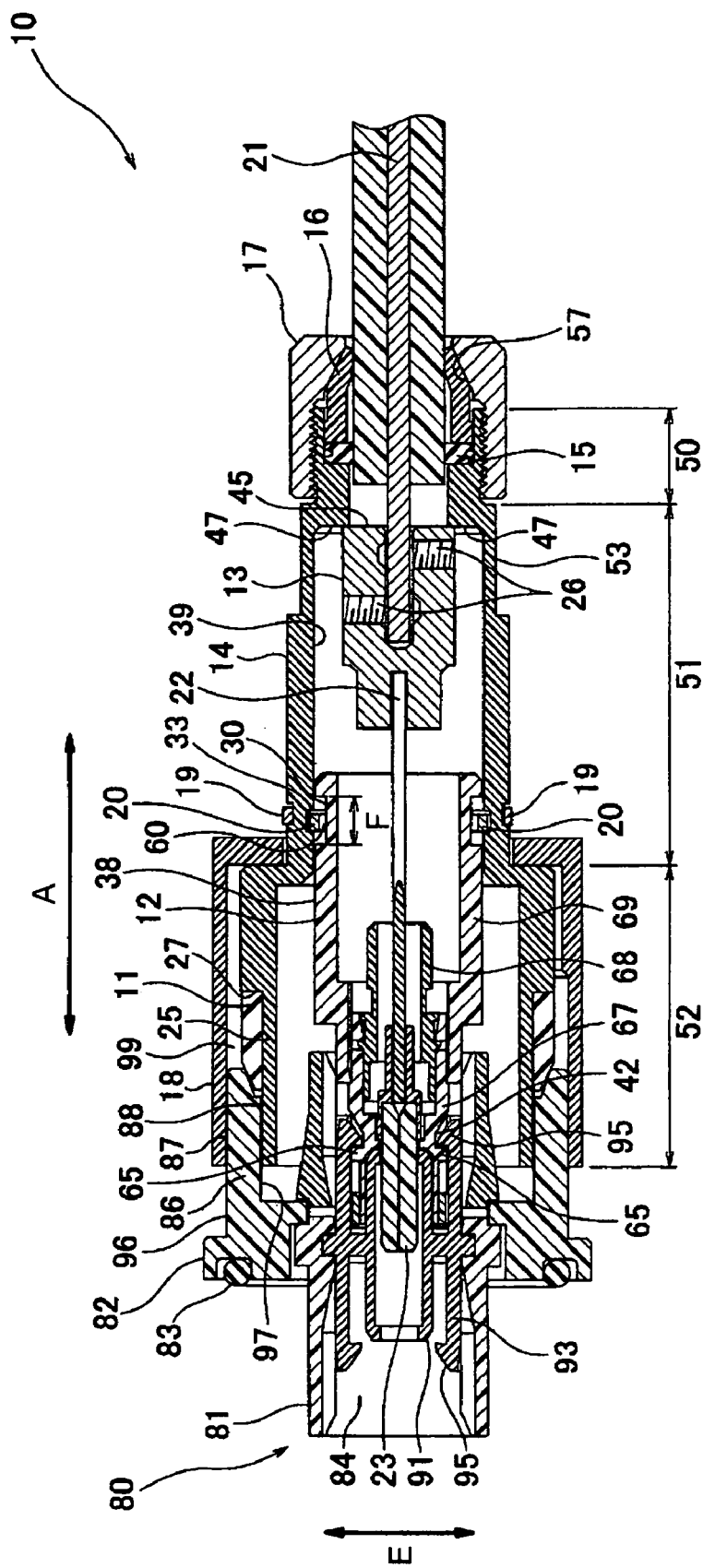
FIG. 4 is a sectional view showing the waterproof connector and the mating connector taken along a line 4-4 in FIG. 3 according to the embodiment of the present invention.
Figure 5:
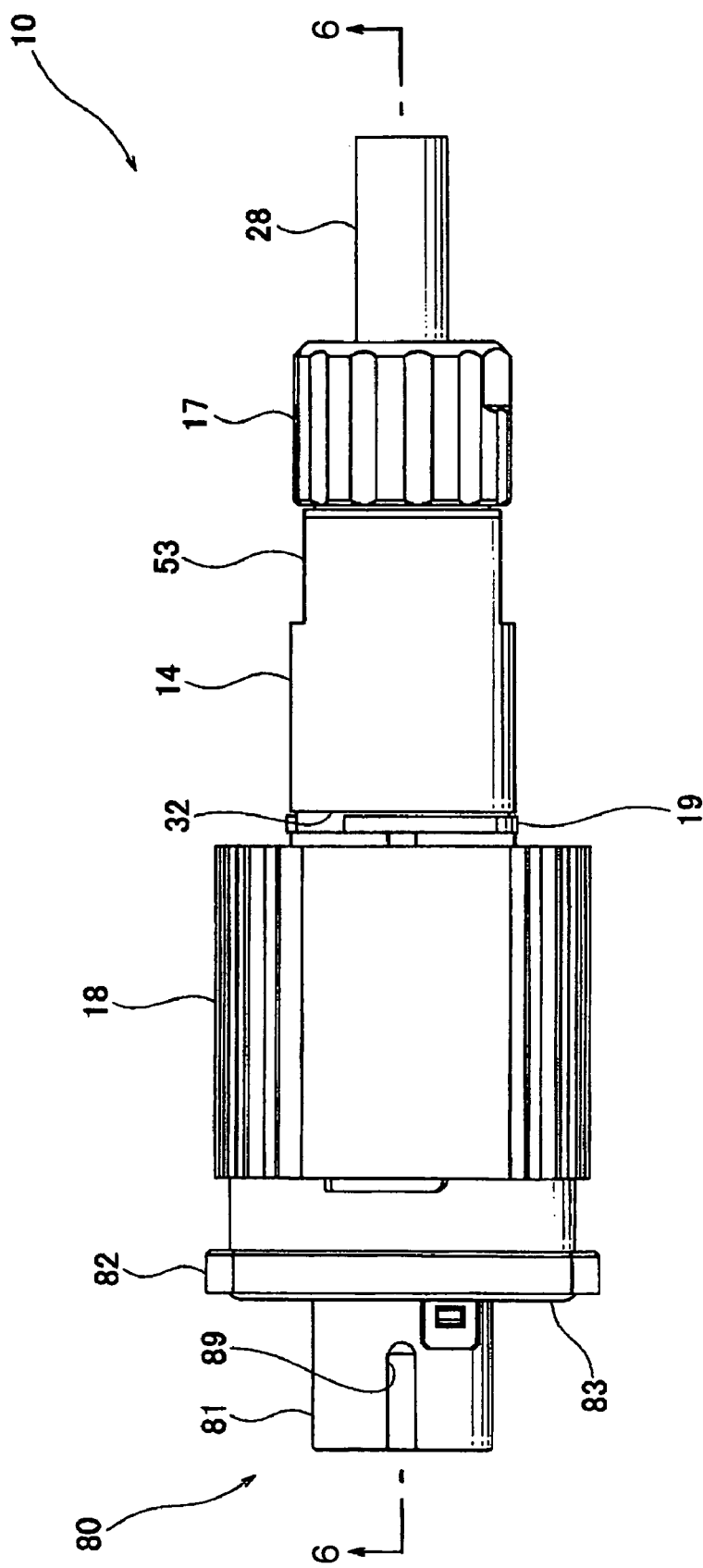
FIG. 5 is a side view showing the waterproof connector and the mating connector according to the embodiment of the present invention.
Figure 6:
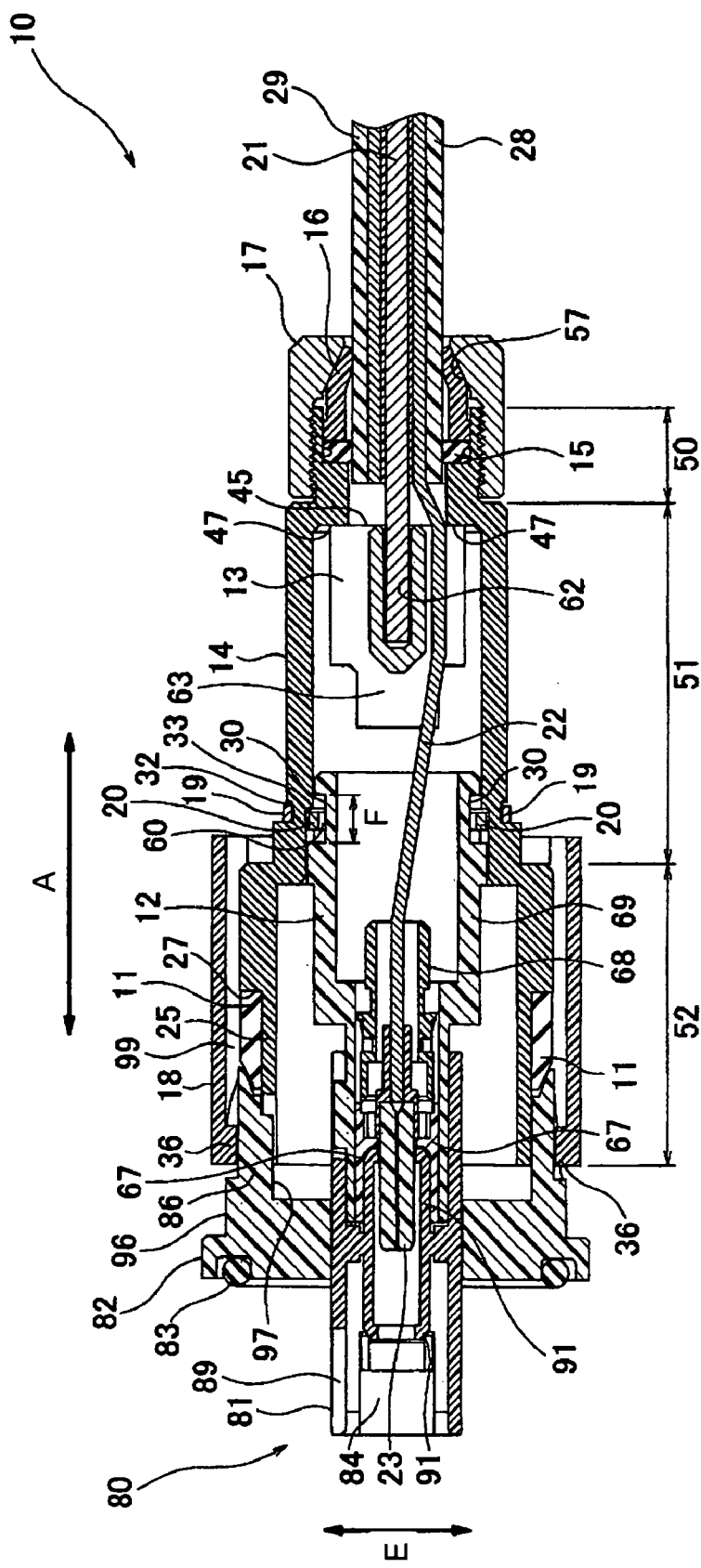
FIG. 6 is a sectional view showing the waterproof connector and the mating connector taken along a line 6-6 in FIG. 5 according to the embodiment of the present invention.

FIG. 2 is an exploded perspective view showing the waterproof connector 10; FIG. 3 is a plan view showing the waterproof connector 10 and the mating connector 80; FIG. 4 is a sectional view showing the waterproof connector 10 and the mating connector 80 taken along a line 4-4 in FIG. 3; FIG. 5 is a side view showing the waterproof connector 10 and a mating connector 80; and FIG. 6 is a sectional view showing the waterproof connector and the mating connector taken along a line 6-6 in FIG. 5, respectively. While FIG. 1 shows a state when the waterproof connector 10 is not yet connected to the mating connector 80, FIGS. 3-6 show a state when the waterproof connector 10 is connected to the mating connector 80.

In use, for example, the mating connector 80 is fixed to a wall surface (not shown) by a screw (not shown) penetrating a screw hole 85. The mating connector 80 includes a circular recess portion 92 for placing an o-ring 83 on an R-shell 82 thereof. With the o-ring 83, it is possible to seal a space between the mating connector 80 and the wall surface, thereby preventing water inflowing of more securely.

The waterproof connector 10 is connected to the mating connector 80 by a bayonet connection, so that the waterproof connector 10 is released. In order to provide the bayonet connection, the mating connector 80 includes a fixing groove 90 in an outer surface of a cylindrical portion 86 thereof. The fixing groove 90 includes a recess 98 at an end portion thereof. A pair of the fixing grooves 90 is situated at positions facing each other. In addition, the waterproof connector 10 includes a protrusion 36 at a position corresponding to each of the fixing grooves 90, on an inner circumference wall of a tip portion of a connecting member 18 thereof. The cylindrical portion 86 of the mating connector 80 extends toward a connector member 12 surrounding a circumference of an adapter member 81 circularly.

In order to connect the waterproof connector 10 to the mating connector 80, first, the protrusion 36 of the connecting member 18 is pushed in along the fixing groove 90 of the cylindrical portion 86 in a direction of an arrow A shown in FIG. 1. Then, the connecting member 18 is rotated along the outer surface of the cylindrical portion 86 in a direction of an arrow B in FIG. 1, thereby putting the protrusion 36 of the connecting member 18 into the recess 98 of the cylindrical portion 86.

The connector member 12 is connected to the adapter member 81 of the mating connector 80 in such a way that the connector member 12 is released. Basic structures or connecting structures of the connector member 12 and the adapter member 81 are well known as conventional connectors such as Single Coupling (SC) connectors and Miniature Unit Coupling (MU) connectors. Therefore, a detailed description thereof is omitted. It is obvious that the apparatus according to the present invention can be applied to the conventional connectors as SC connectors and MU connectors widely.

The connector member 12 includes a first member 67 supporting a ferrule 23; a second member 68 fixed inside the first member 67; and a third member 69 fixed outside the first member 67. The first member 67, the second member 68 and the third member 69 are arranged in one line. The first member 67, the second member 68 and the third member 69 are formed cylindrically respectively, so that an optical fiber 22 or the ferrule 23 can penetrate therethrough. The optical fiber 22 is fixed to an end surface of the ferrule 23 in a state of exposing a fiber core 24. For example, the optical fibers 22 are aligned in parallel so as to sandwich a tension member 21 (rigid cord member) from bilateral sides. The optical fiber 22 extends so as to enter inside the connector member 12, being surrounded by a covering 29 of a cable 28, together with the tension member 21. In the embodiment, one optical fiber is used.

The adapter member 81 includes a pair of receptacle portions 84 facing each other for fitting the connector member 12 and a mating connector member together, by facing each other from opposed directions. When a mating ferrule supported by the mating connector member (not shown) is placed in one of the receptacle portions 84 located on a side of the mating connector 80, the ferrule 23 of the waterproof connector 10 can be connected to the mating ferrule (not shown) of the mating connector 80 by fitting the connector member 12 into the receptacle portion 84 located a side of the waterproof connector 10.

The ferrule 23 connects to the mating ferrule by facing and contacting each other through a connecting sleeve 91 of the adapter member 81, thereby performing an optical link. The connector member 12 may include a positioning protrusion 37 and the adapter member 81 may include a positioning groove 89 at a corresponding position to the positioning protrusion 37 respectively, so that the connector member 12 can be fitted to the adapter member 81 smoothly.

The adapter member 81 further includes two pairs of elastic deforming portions 93. One pair of the elastic deforming portions 93 extends toward a side of the waterproof connector 10, and the other pair of the elastic deforming portions 93 extends toward a side of the mating connector 80.

Figure 7:
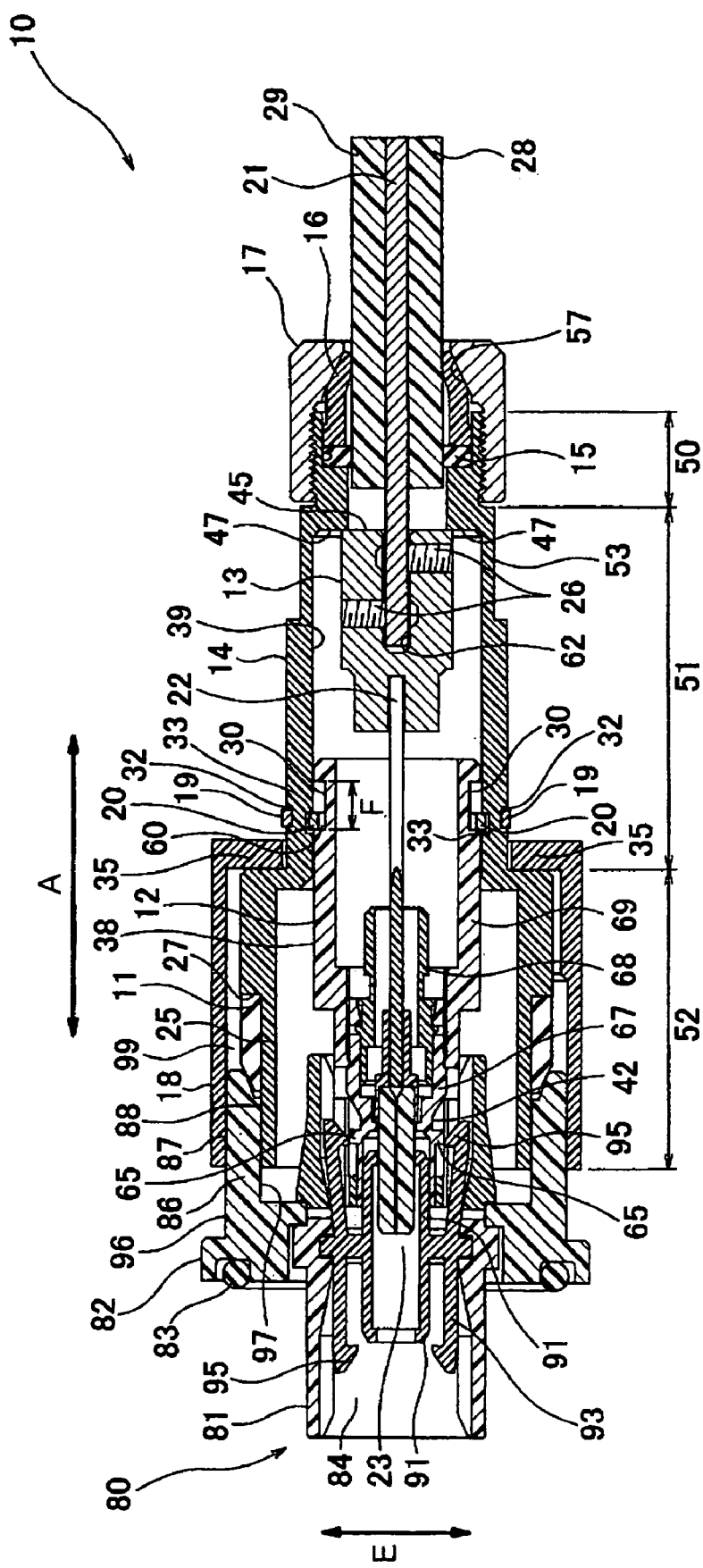
FIG. 7 is a sectional view showing a connector member and an adapter member when the waterproof connector and the mating connector are connected according to the embodiment of the present invention.

As shown in FIG. 7, when the connector member 12 is fitted to the adapter member 81, each elastic deforming portion 93 deforms in a direction apart from each other through a contact of an engaging protrusion 95 provided at a tip portion of each elastic deforming portion 93 and a protruding portion 65 of the connector member 12 or the first member 67. When the elastic deforming portion 93 moves over the protruding portion 65, the engaging protrusion 95 engages a recess 42 on the connector member 12. As a result, the connector member 12 engages the adapter member 81, and the ferrule 23 can maintain a state of facing and contacting with the mating ferrule.

The waterproof connector 10 includes a main body portion 14 having a cylindrical shape; a holding metal member 13; the connector member 12; a rubber hood 11; a gasket 15; a cord clamp 16; a tightening metal member 17; and the connecting member 18. The holding metal member 13, the connector member 12 and the rubber hood 11 are attached to the main body portion 14 in order, in a direction of an arrow C shown in FIG. 2. The gasket 15, the cord clamp 16, the tightening metal member 17 and the connecting member 18 are attached to the main body portion 14 in order, in a direction of an arrow D shown in FIG. 2. Each of the rubber hood 11, the gasket 15, the cord clamp 16 and the tightening metal member 17 has an approximate cylindrical shape, corresponding to the main body portion 14.

The main body portion 14 is practically constituted with a small radius portion 50, a medium radius portion 51 and a large radius portion 52. The gasket 15, the cord clamp 16 and the tightening metal member 17 are attached to the small radius portion 50 having the cable 28 inserted therein. An inner radius of the small radius portion 50 is enlarged at a rear end side thereof. The gasket 15 is inserted into the enlarged radius portion and the cord clamp 16 is attached, so that the gasket 15 having the cable 28 inserted therein is forcibly pressed by the cord clamp 16. Further, the tightening metal member 17 is attached so that the tightening metal member 17 presses forcibly to shrink a radius of an elastic portion 58 provided at a rear end of the cord clamp 16.

An inner radius of the tightening metal member 17 is reduced gradually to a rear end thereof in order to press forcibly the elastic portion 58 and fix the cable 28. Consequently, the tightening metal member 17 includes a slope portion 57 at an inner surface thereof. The small radius portion 50 may include a cut portion 55 and the cord clamp 16 may include a protrusion 56, respectively, for easy positioning of the cord clamp 16 against the small radius portion 50. An outer surface of the small radius portion 50 and the elastic portion 58 at the rear end of the cord clamp 16 and protruding from the small radius portion 50 are completely covered with the tightening metal member 17 when all of the parts described above are attached to the small radius portion 50.

The medium radius portion 51 supports the connector member 12. The connector member 12 has an outer radius at a rear end side thereof or the third member 69, approximate equal to an inner radius of the medium radius portion 51. A portion of the rear end of the connector member 12 is movably inserted into the medium radius portion 51. As a result, the connector member 12 is supported by the main body portion 14 being able to slide along a facing direction of the ferrule 23 and the mating ferrule (direction shown by the arrow A in FIG. 2 or a facing direction) in a given range.

In addition, the holding metal member 13 is contained inside the medium radius portion 51. The holding metal member 13 has an outer radius smaller than the inner radius the medium radius portion 51 and is inserted completely into the medium radius portion 51. The holding metal member 13 includes a fixing hole 62 for inserting one end of the tension member 21. The holding metal member 13 and the tension member 21 can be fixed together by inserting the tension member 21 into the fixing hole 62 and using a screw (not shown) penetrating through a screw hole 26.

Further, the holding metal member 13 includes a breach 63 opened in a vertical direction along the both ends of the fixing hole 62 for bringing out the optical fiber 22. By fixing the holding metal member 13 and the tension member 21 together, for example, it is possible to reduce a force applied to the optical fiber 22 by abutting a back surface 45 of the holding metal member 13 against a circular wall surface 47 of the main body portion 14, when the tension member 21 is pulled toward an opposite side of the mating connector 80 in the facing direction.

After a back board 35 of the connecting member 18 is attached to a front end side of an outer circumference of the medium radius portion 51 near a border between the medium radius portion 51 and the large radius portion 52, a retaining member 19 (a spring washer) having a C character shape is attached thereto. The retaining member 19 prevents the connecting member 18 from coming off from the medium radius portion 51, by abutting against the back board 35 of the connecting member 18 supported by the medium radius portion 51. The retaining member 19 is fitted to a circular C character recess portion 32 of the medium radius portion 51 using an elastic function thereof.

A combining member 20 (a spring washer) having a C character shape is attached to a front end side of an inner circumference of the medium radius portion 51, near an inner side of the retaining member 19. The combining member 20, as well as the retaining member 19, is fitted using an elastic function thereof.

The combining member 20 combines a space 60 formed by a circular outer recess portion 30 provided on an outer wall 38 of the connector member 12 and a circular inner recess portion 33 provided on an inner wall 39 of the main body portion 14. Each of the circular outer recess portion 30 and the outer wall 38 has a recess in a direction crossing the facing direction (shown by an arrow E).

Especially, the circular outer recess portion 30 has a span larger than a span of the combining member 20 (shown by an arrow F). The connector member 12 can slide over a specific range relative to the main body member 14 using the span of the circular outer recess portion 30. Flat portions 53 facing each other are provided on a portion of a rear end of the medium radius portion 51 for being tightened with a tool such as a wrench. The tightening metal member 17 also includes flat portions.

The large radius portion 52 includes a cylinder portion 25 jutting out along the facing direction and toward the cylindrical portion 86 of the mating connector 80. The connector member 12 can slide inside the cylinder portion 25 along the facing direction in the given range.

When the waterproof connector 10 and the mating connector 80 is connected and fixed, the cylinder portion 25 contacts an inner circumference 97 of the cylindrical portion 86. Thus, an overlap portion 88 can be formed between the cylinder portion 25 and the cylindrical portion 86 in the facing direction. With the overlap portion 88, it is possible a waterproofing function to be more effective.

In addition, the connecting member 18 with an approximate cylindrical shape, being penetrated by the medium radius portion 51 is inserted movably into the large radius portion 52. The connecting member 18 has the approximate cylindrical shape jutting out toward the mating connector 80 along the facing direction of the ferrule 23 and the mating ferrule and covers an outer circumference of the large radius portion 52.

Further, the connecting member 18 is connected to the cylindrical portion 86 of the mating connector 80 by the bayonet connection described above when the waterproof connector 10 is connected to the mating connector 80. When the waterproof connector 10 is connected to the mating connector 80, the cylindrical portion 86 of the mating connector 80 is situated into a space 99 formed between the cylinder portion 25 of the waterproof connector 10 and the connecting member 18. The connecting member 18 surrounds an outer circumference 96 of the cylindrical portion 86.

Further, as well as the cylinder portion 25, the connecting portion 18 can form an overlap portion 87 with the cylindrical portion 86 in the facing direction. With a configuration described above, it is possible the waterproofing function to be more certain. The waterproof function is further improved by the rubber hood 11 situated in the space 99 formed between the cylinder portion 25 and the connecting member 18. The rubber hood 11 is positioned so as to abut a rear surface thereof against a step portion 27 of the cylinder portion 25 configuring a portion of the large radius portion 52.

Next, with reference to FIGS. 8(a)-8(b) and 9(a)-9(b), an operation of the waterproof apparatus 1 will be explained. FIGS. 8(a)-8(b) and 9(a)-9(b) are sectional views showing a configuration supporting the connector member 12 being able to slide, especially showing a configuration around the combining member 20.

Figure 8A:
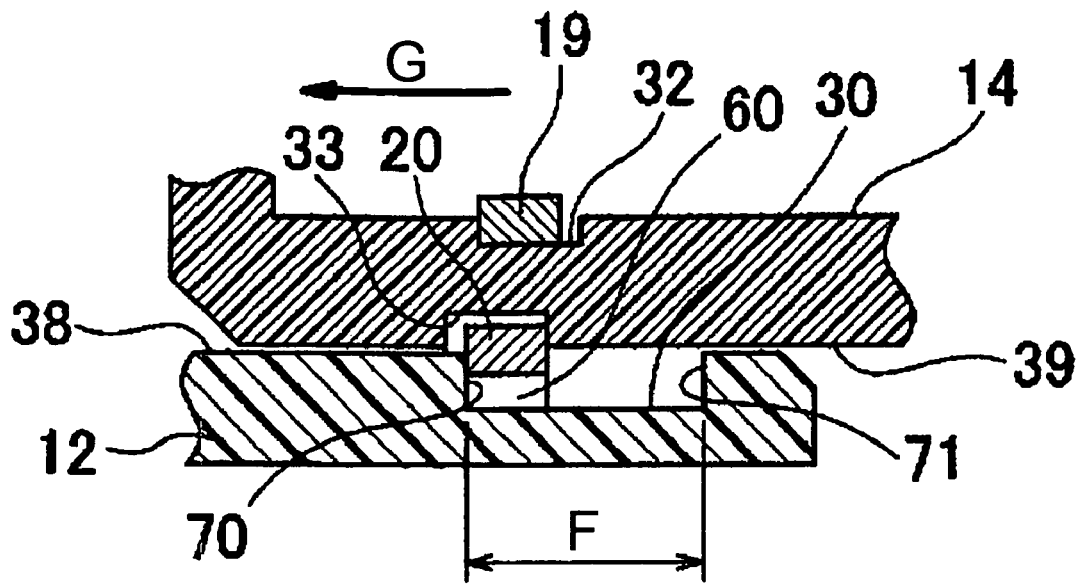
FIGS. 8(a) and 8(b) are sectional views showing the waterproof connector in a state that the waterproof connector is connected to the mating connector according to the embodiment of the present invention.
Figure 8B:
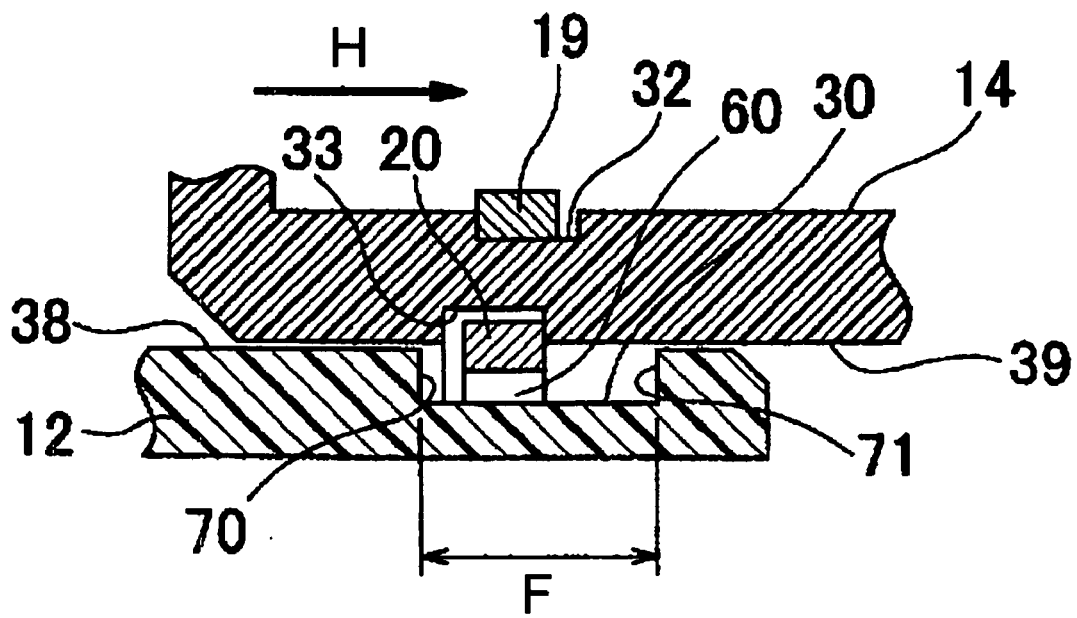
Figure 9A:
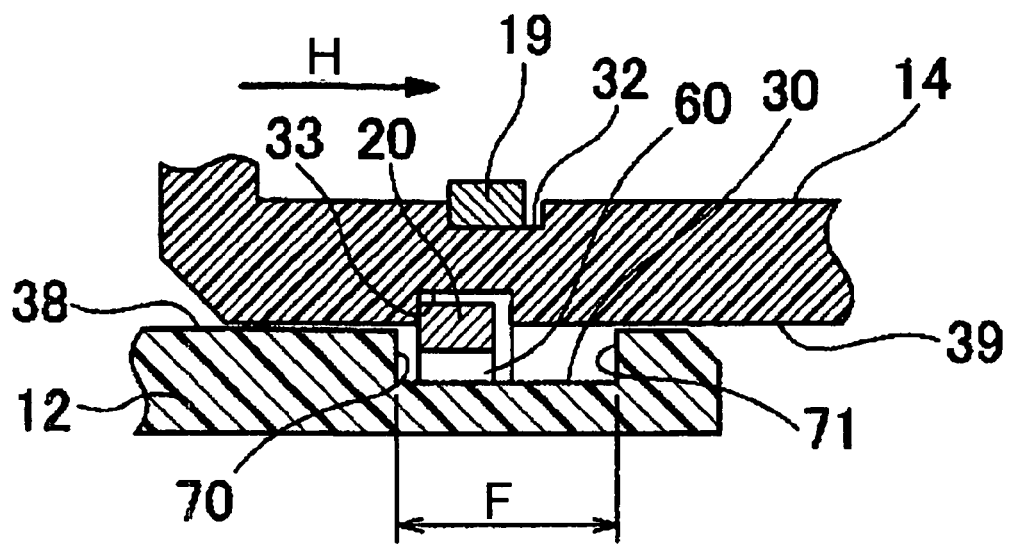
FIGS. 9(a) and 9(b) are sectional views showing the waterproof connector in a state that the waterproof connector is released from the mating connector according to the embodiment of the present invention.
Figure 9B:
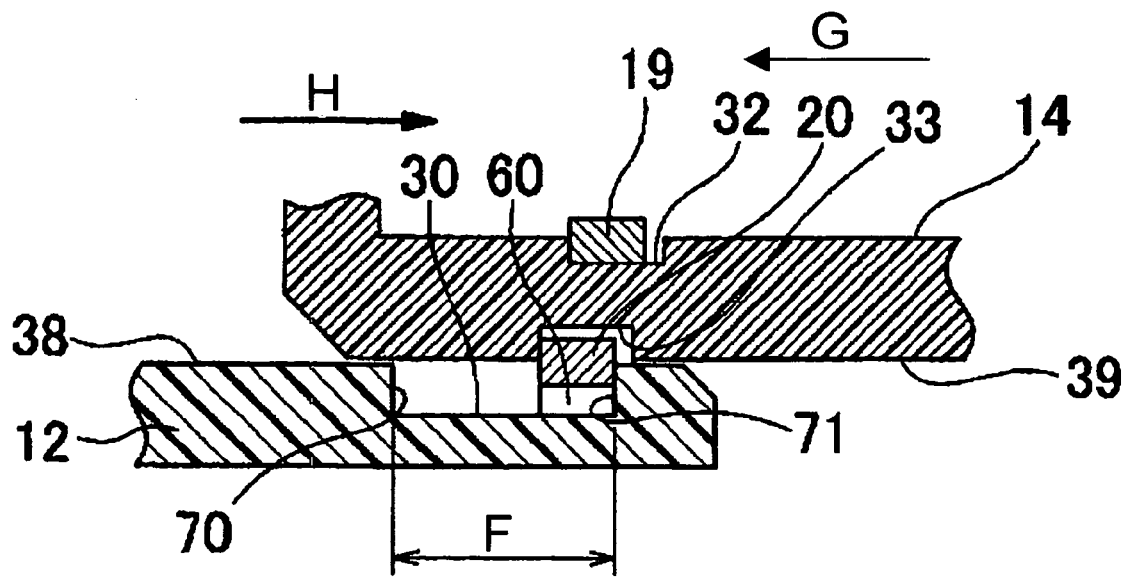
Figure 10:
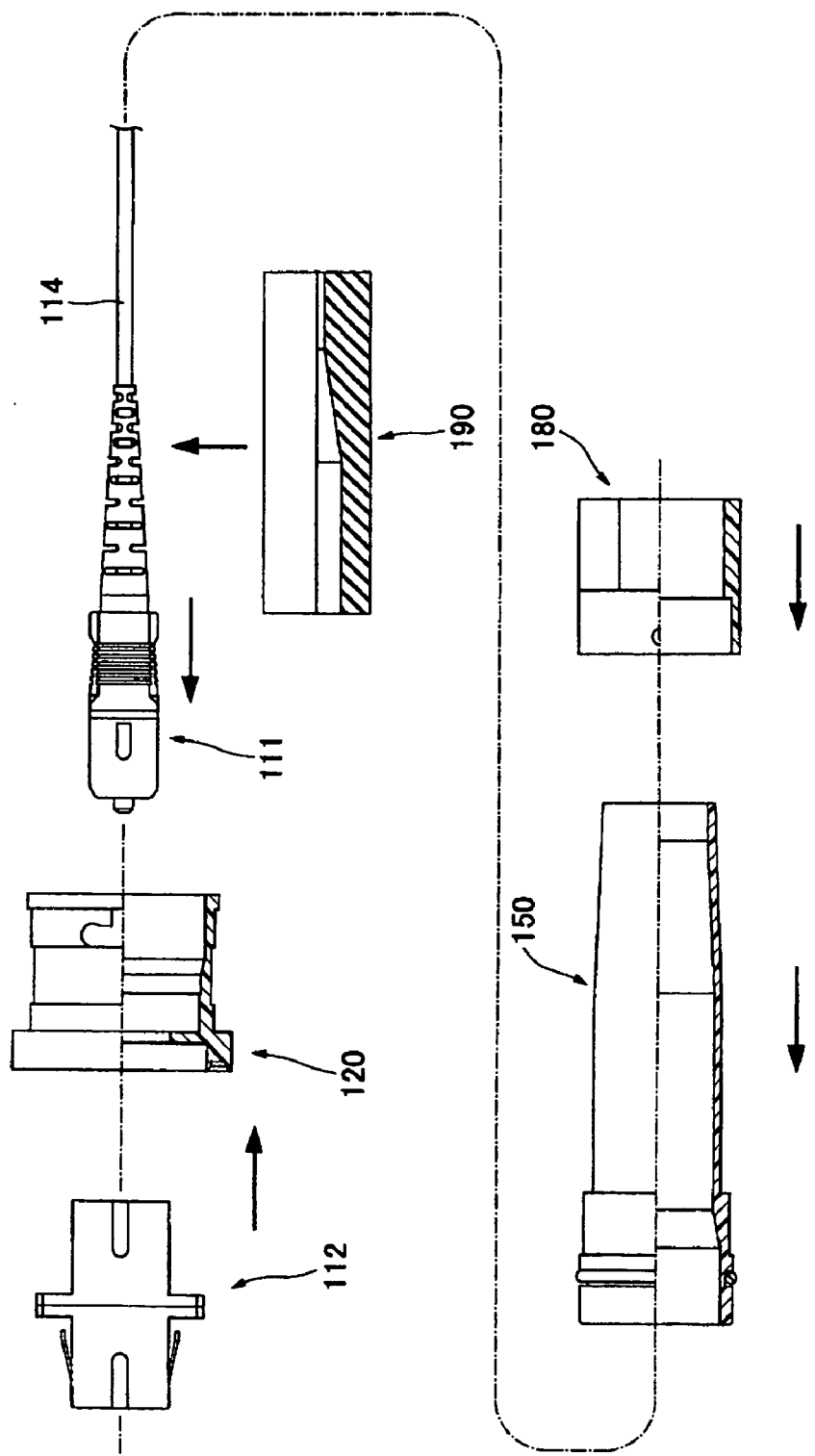
FIG. 10 is a view showing a conventional waterproof connector and a conventional waterproof apparatus.

FIGS. 8(a) and 8(b) are sectional views showing a state when the waterproof connector 10 is connected to the mating connector 80. FIGS. 9(a) and 9(b) are sectional views showing a state when the waterproof connector 10 is released from the mating connector 80, respectively.

Since the main body portion 14 is easy to grasp firmly, the waterproof connector 10 is connected to the mating connector 80 by operating the main body portion 14, not the connector member 12. When the waterproof connector 10 is connected to the mating connector 80, the main body portion 14 is moved toward the mating connector 80 in the facing direction (a direction shown by an arrow G) in order to connect the connector member 12 to the adapter member 81.

As shown in FIG. 8(a), the combining member 20 held by the circular inner recess portion 33 of the main body portion 14 moves toward the mating connector 80 (the direction shown by the arrow G) within the circular outer recess portion 30. Thus, the combining portion 20 abuts and contacts a front surface 70 of the connector member 12, thereby the connector member 12 also moves toward the mating connector 80 (the direction shown by the arrow G). Since the connecting member 18 is supported by the main body portion 14, the connecting portion 18 also can move toward the cylindrical portion 86.

As shown in FIG. 8(b), even after the connector member 12 is fitted to the adapter member 81, it is possible for the main body portion 14 to slide relative to the connector member 12 in the facing direction, using the span of the circular outer recess portion 30 (shown by the arrow F). Accordingly, the connecting member 18 can be fixed to the cylindrical portion 86 easily, even though the connecting member 18 moves in the facing direction in some measure, due to the bayonet connection and so on.

When the waterproof connector 10 is released from the mating connector 80, as shown in FIG. 9(a), since the main body portion 14 can slide relative to the connector member 12 in the facing direction using the span of the circular outer recess portion 30 (shown by the arrow F), it is possible for the connecting member 18 to be released from the cylindrical portion 86, even though the connecting member 18 moves in the facing direction in some measure, due to releasing the bayonet connection and so on.

Then, the connecting member 18 slides to the opposite side of the mating connector 80 in the facing direction (shown by an arrow H), thereby the connecting member 18 supported by the main body portion 14 is apart from the cylindrical portion 86. At the same time, the connector member 12 also supported by the main body portion 14 is apart from the adapter member 81 as well.

Further, as shown in FIG. 9(b), the combining member 20 held by the circular inner recess portion 33 of the main body portion 14 is moved within the circular outer recess portion 30 toward the mating connector 80 (the direction shown by the arrow G), thereby abutting and contacting a rear surface 71 of the connector member 12. Consequently, the connector member 12 is moved to the opposite side of the mating connector 80 (shown by the arrow H) together with the main body portion 14 so that the connecting member 18 is apart from the cylindrical portion 86. At the same time, it is possible the connector member 12 to be released from the adapter member 81.

According to the embodiment of the present invention, when the waterproof connector 10 is connected to the mating connector 80, it is possible to fit the connector member 12 to the adapter member 81 as well as connecting the connecting member 18 to the cylindrical portion 86 (or to fix the connecting member 18 to the cylindrical portion 86 by the bayonet connection), by one operation of moving the main body portion 14 relative to the connector member 12.

When the waterproof connector 10 is released from the mating connector 80, it is possible to release the bayonet connection between the connecting member 18 and the cylindrical portion 86 as well as releasing the connector member 12 from the adapter member 81, by one operation of moving the main body portion 14 relative to the connector member 12. As a result, the operation of connecting and releasing the connectors can be more streamlined.

The disclosure of Japanese Patent Application No. 2008-146659, filed on Jun. 4, 2008 is incorporated in the application by reference.

While the invention has been explained with reference to the specific embodiments of the invention, the explanation is illustrative and the invention is limited only by the appended claims.

What is claimed is:

1. A connector to be connected to a mating connector, comprising:
   a connector member for supporting a ferrule capable of contacting with a mating ferrule of the mating connector, said connector member being detachably connected to an adapter member arranged in the mating connector for supporting the mating ferrule so that the connector member is disconnected from and connected to the adapter member in a state that the ferrule contacts with the mating ferrule;

a connecting member having an approximate cylindrical shape, said connecting member to be connected to a cylindrical portion of the mating connector;

a main body portion for supporting the connecting member and the connector member so that the connector member slides along a facing direction that the ferrule faces the mating ferrule within a specific range, said main body portion moving toward the mating connector relative to the connector member in the facing direction so that the connector member approaches the adapter member and the connecting member approaches the cylindrical portion simultaneously, and the main body portion moves relative to the connector member in the facing direction in order to connect the connecting member to the cylindrical portion after the connector member is connected to the adapter member when the connector is connected to the mating connector, said main body portion moving relative to the connector member in the facing direction in order to release the connector member from the adapter member and moving to an opposite side of the mating connector relative to the connector member in the facing direction so that the connecting member moves apart from the cylindrical portion and the connector member moves apart from the adapter member simultaneously when the connector is released from the mating connector; and a combining member disposed in recess portions provided in an outer wall of the connector member and an inner wall of the main body portion and extending in a direction crossing the facing direction so that the combining member supports the connector member to be capable of sliding relative the main body portion in the facing direction.

2. The connector according to claim 1, wherein said connecting member extends toward the mating connector in the facing direction and to be connected to the cylindrical portion extending from the mating connector toward the connector member and surrounding a circumference of the adapter member circularly along the facing direction.

3. The connector according to claim 1, wherein said connecting member forms an overlap portion with the cylindrical portion when the connecting member is connected to the cylindrical portion.

4. The connector according to claim 1, wherein said recess portion provided in the outer wall of the connector member has a span larger than the combining member in the facing direction.

5. The connector according to claim 1, wherein said combining member is arranged to fit into the main body portion with a space in between.

6. The connector according to claim 1, wherein said main body portion includes a cylinder portion protruding toward the mating connector in the facing direction so as to form an overlap portion with an inner circumference of the cylindrical portion of the main body portion when the connecting member is connected to the cylindrical portion of the mating connector.

7. The connector according to claim 6, wherein said cylindrical portion of said main body portion is situated in a space formed between the connecting member and the cylinder portion when the waterproof connector is connected to the mating connector.

8. The connector according to claim 1, wherein said main body portion includes a holding member disposed inside the main body portion and fixed to a rigid cord member extending inside the main body portion together with an optical fiber connected to the ferrule, the member abutting against a wall surface of the main body portion to reduce or eliminate a force applied to the optical fiber when the rigid cord member is pulled to the opposite side of the mating connector in the facing direction.

9. An apparatus comprising the connector according to claim 1 and the mating connector connecting to each other.

* * * * *